United States Patent
Bai

(10) Patent No.: US 10,475,153 B1
(45) Date of Patent: Nov. 12, 2019

(54) APPARATUS AND COMPUTER PROGRAM PRODUCTS FOR OBJECT RENDERING METHOD THAT RENDERS OBJECT EFFICIENTLY USING A PLURALITY OF PROCESSOR CORES

(71) Applicant: KYOCERA Document Solutions Inc., Osaka (JP)

(72) Inventor: Xuqiang Bai, Torrance, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 16/045,540

(22) Filed: Jul. 25, 2018

(51) Int. Cl.
| | |
|---|---|
| G06K 15/02 | (2006.01) |
| G06T 15/00 | (2011.01) |
| G06T 1/20 | (2006.01) |
| G06F 3/12 | (2006.01) |

(52) U.S. Cl.
CPC ............ *G06T 1/20* (2013.01); *G06K 15/1857* (2013.01); *G06T 15/005* (2013.01); *G06F 3/1239* (2013.01); *G06T 2210/52* (2013.01)

(58) Field of Classification Search
None
See application file for complete search history.

(56) References Cited

U.S. PATENT DOCUMENTS

| | | | |
|---|---|---|---|
| 8,334,989 B2 | 12/2012 | Ishikawa et al. | |
| 8,593,466 B2 * | 11/2013 | Barringer | G06T 15/005 345/502 |
| 8,861,014 B2 | 10/2014 | Bellert | |
| 2013/0342873 A1 * | 12/2013 | Mori | H04N 1/21 358/1.16 |
| 2015/0339550 A1 | 11/2015 | Ishiguro et al. | |

FOREIGN PATENT DOCUMENTS

JP 2011143576 A 7/2011

* cited by examiner

*Primary Examiner* — Joni Richer
(74) *Attorney, Agent, or Firm* — Law Office of Alexis J. Saenz

(57) ABSTRACT

A system, method, and apparatus provide an improvement to image rendering and the computing resources used to render processing intensive image objects. Exemplary embodiments receive an image object and depending on the type of image object, the image object size, or complexity, a determination is made as to whether the image object should be divided up and processed using multiple threads with a multi-core computer processor. When multiple threads are used, a different thread is assigned to each section of the divided-up image object. Each section may then be processed by its respective thread until converted and mapped into an output image space that yields a final rendered image.

20 Claims, 9 Drawing Sheets

APPARATUS AND COMPUTER PROGRAM PRODUCTS FOR OBJECT RENDERING METHOD THAT RENDERS OBJECT EFFICIENTLY USING A PLURALITY OF PROCESSOR CORES

CROSS-REFERENCE TO RELATED APPLICATION

None.

FIELD

The subject disclosure relates to image processing and more particularly to systems, processes, and computer program products for image rendering of objects using a plurality of processor cores.

BACKGROUND

Image processing can involve a lot of processing power depending on the size and complexity of an image. Raster image process rendering is one of the most time-consuming parts of a printing process. The more computing resources needed and time expended to process images, the lower the productivity in the workplace.

As can be seen, there is a need to improve on the process of rendering image objects to improve efficiency in the workplace.

SUMMARY

In one aspect of the disclosure, a method of image object rendering, by a computer processor with multiple cores comprises retrieving a number of cores in the computer processor; determining a number of threads N available to run processes in parallel in the number of cores; receiving an image object for rendering; assigning a first available thread, from the determined number of threads N available, to a first section of the image object; assigning a second available thread, from the determined number of threads N available, to a second section of the image object; and rendering the first section of the image object using the first available thread, in parallel with, rendering the second section of the image object using the second available thread.

In another aspect, a computer program product for image object rendering, by a computer processor with multiple cores, comprises a non-transitory computer readable storage medium having computer readable program code embodied therewith. The computer readable program code being configured, when executed by the processor with multiple cores, to: retrieve a number of cores in the computer processor; determine a number of threads N available to run processes in parallel in the number of cores; receive an image object for rendering; assign a first available thread, from the determined number of threads N available, to a first section of the image object; assign a second available thread, from the determined number of threads N available, to a second section of the image object; and render the first section of the image object using the first available thread, in parallel with, rendering the second section of the image object using the second available thread.

In yet another aspect, an image rendering computing device comprises a memory module; and a multi-core processor in communication with the memory module, the multi-core processor configured, via a set of executable instructions stored in the memory module, to: retrieve a number of cores in the multi-core computer processor; determine a number of threads N available to run processes in parallel in the number of cores; receive an image object for rendering; assign a first available thread, from the determined number of threads N available, to a first section of the image object; assign a second available thread, from the determined number of threads N available, to a second section of the image object; and render the first section of the image object using the first available thread, in parallel with, rendering the second section of the image object using the second available thread.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1:
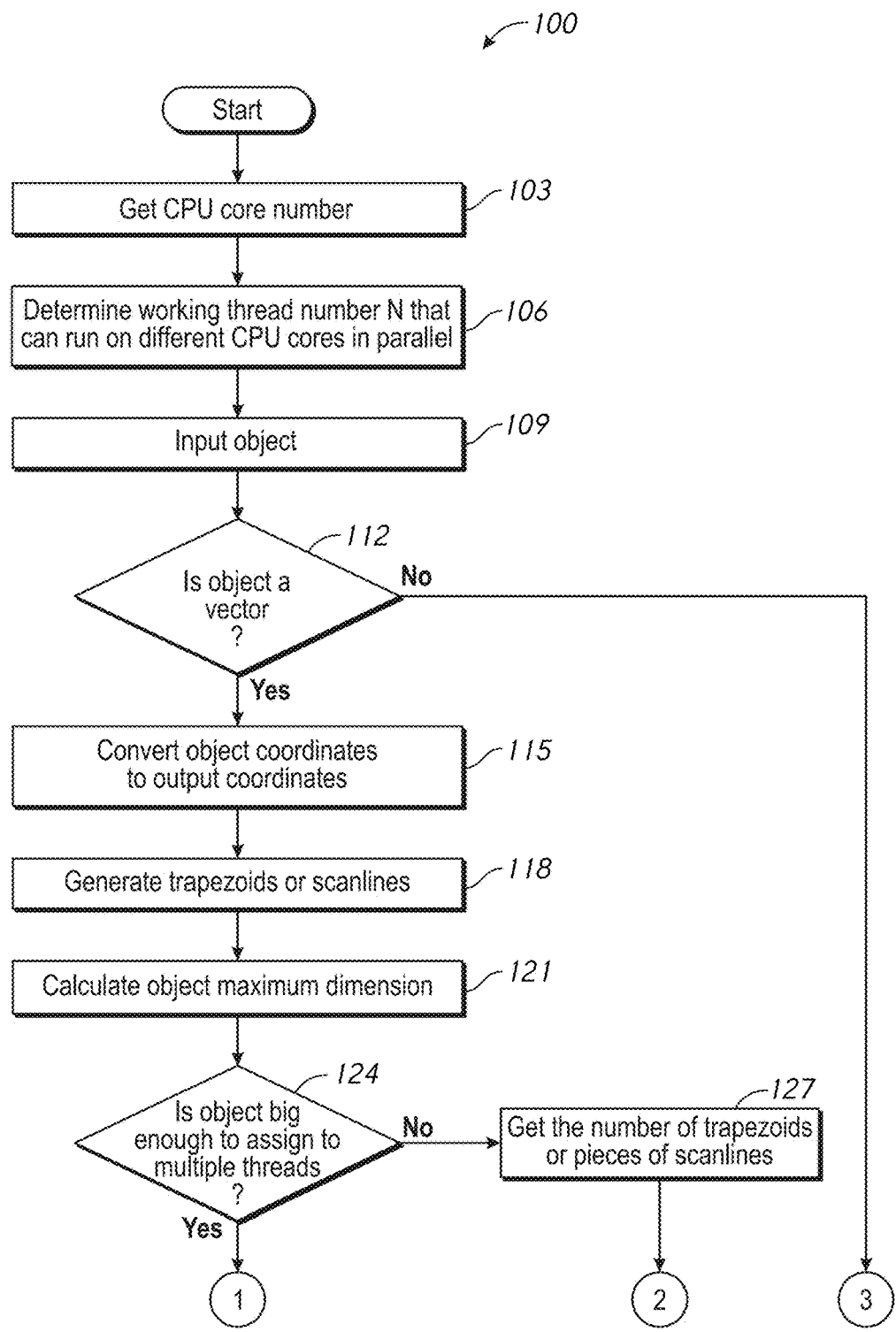
FIGS. 1 and 2 are a flowchart of a method of rendering an object using multiple threads in a multi-core processor in accordance with an embodiment of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

As will be appreciated, embodiments disclosed below may be practiced in and have industrial applicability to the general fields of image rendering and printing.

Generally, embodiments of the subject technology improve the field of digital image rendering. Aspects of the subject technology distribute the workload of raster image processing among multiple computer processor cores to speed up the processing and more efficiently utilize computing resources. Unlike conventional image processing, which generally uses a single thread to process an entire image object, aspects of the present disclosure analyze the object for its type, size, and complexity to determine whether dividing the object up into different sections, each assigned to a different processing thread justifies the computing resources used to process the object. Elements of the processes disclosed below solve problems with the current state of image processing, which suffers from issues such as computing processor resources being overwhelmed by complex objects and the time to process an object being too long. Raster image processing especially is prone to being processing power intensive. And in some cases, leads to lost pixel mapping in the conversion of an input image into a raster image. As will be appreciated, features of the processes divided the processing workload up for an image object so that the image may be processed within a time that justifies the use of the processing resources. In addition, some techniques ensure that image data is preserved in the final conversion which enhances the quality of the final image.

For the following flowcharts, steps of the processes may be referred to as blocks and/or by reference numeral. As will be described further below, steps may be performed by a machine, for example, a computing device, an image forming apparatus, and/or a processing unit. While the steps may be described in one order, it will be understood that variations to the order may be practiced or the order in which claims below are written may vary from the following without departing from the scope of the invention.

Figure 2:
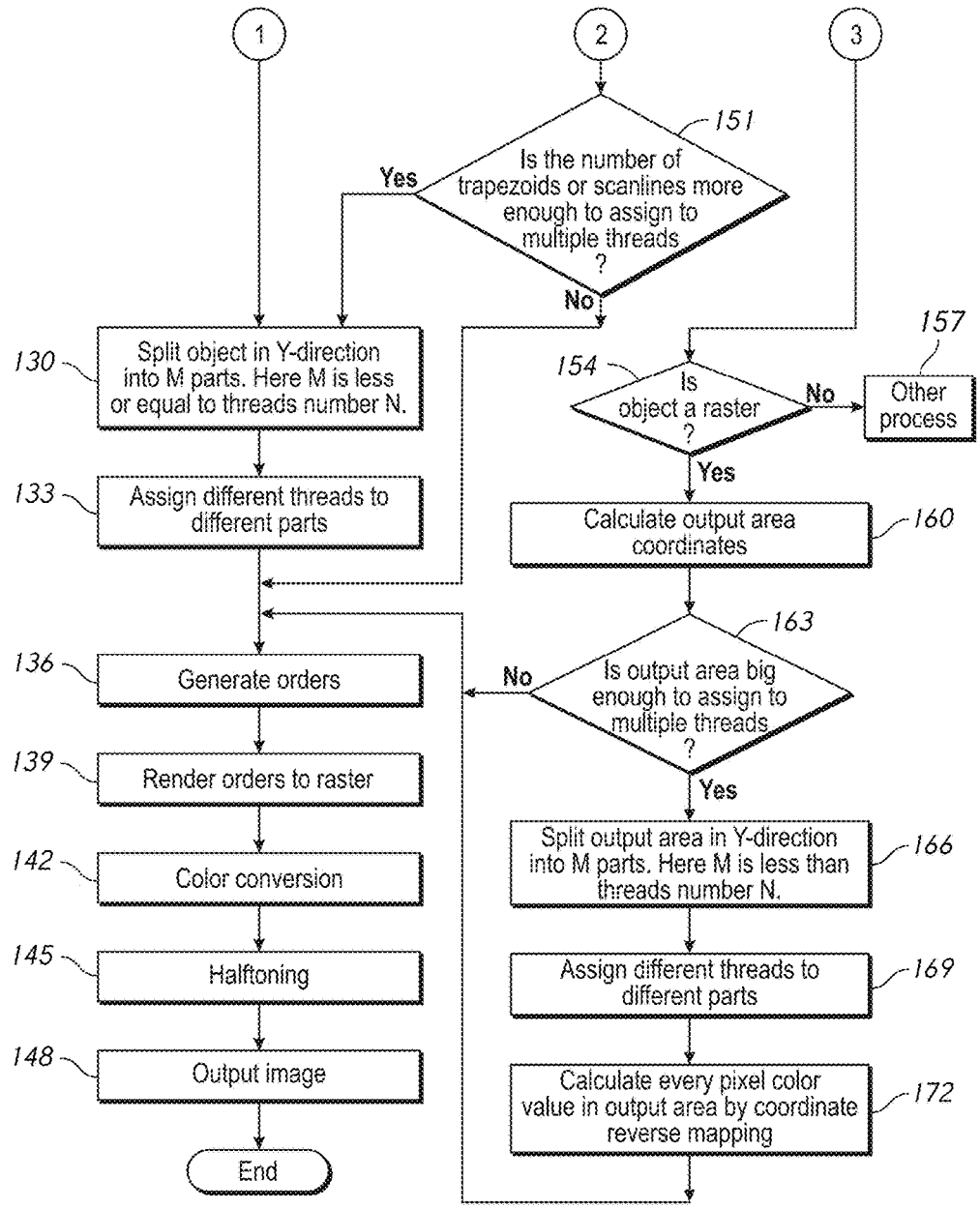

Referring now to FIGS. 1 and 2, a method 100 of rendering an image object using multiple threads in a multi-core processor is shown according to an exemplary embodiment. In some aspects, steps in the method 100 may reflect actions executed in the background of a computing environment (the details of which are described below with respect to FIGS. 8-10). In that respect, steps may be referred to as being executed by the "system" which may include solely an individual computing device executing software-based instructions, a computing device connected to another computing device, or a computing device connected to an image rendering/printing apparatus. The method 100 may be applied to various image objects and depending on the type of image object input into the system, the method 100 may determine under various criteria, whether processing of the image object should be performed by use of multiple threads running in parallel.

Figure 3:
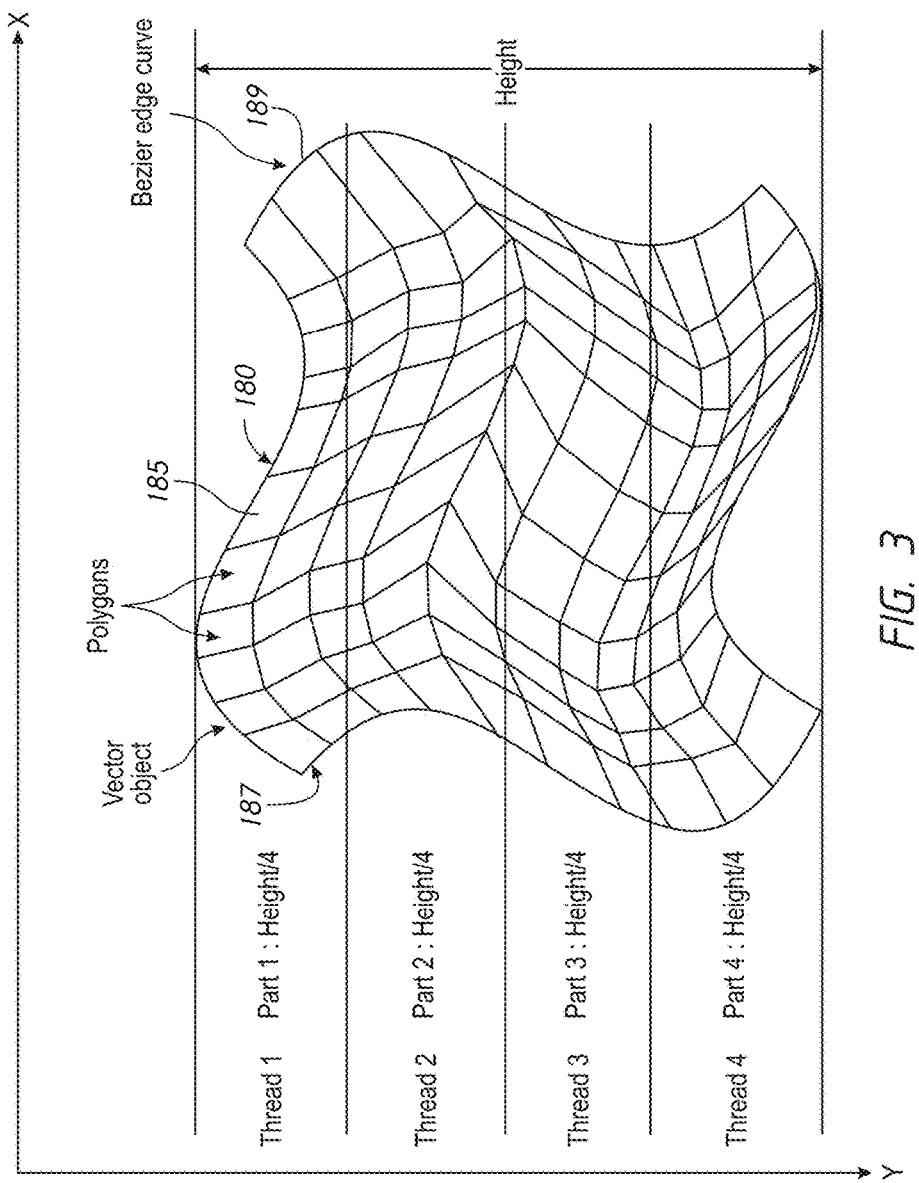
FIG. 3 is a chart of a process for assigning rendering tasks of an object to multiple threads of a processor in accordance with embodiments of the subject technology.

When a computing device is running a software-based embodiment, the method 100 may begin by having a computer processor retrieve 103 a number of computer processor cores (referred to generally throughout as "cores"), available in a computing system executing the method 100. For example, if the computing system is using cores for other purposes, the number of cores remaining (or less) may be designated for use in the method 100 for rendering an image object. From the number of available cores, a determination 106 may be performed as to the number of working threads that may run in parallel on different cores. An object may be received (for example, input by a user or queued up by an automated program for rendering objects) 109. In some embodiments, a determination 112 may be performed determining whether the input object is a vector-based object. If the object is vector-based, then the object coordinates may be converted 115 into a map of output coordinates for a rendered image. Referring temporarily and concurrently to FIG. 3, an example of a vector-based object 180 is shown, which illustrates some of the step features used by the method 100. In FIG. 3, a 4-edge Bezier curve enclosed vector object 180 is input for the rendering process. The output coordinates may be represented by the outline of Bezier edge curves 189. The method 100 may further include generating 118 polygons 185 (such as trapezoids) or scan lines 187 within the boundaries of the object coordinates, (in this instance, the Bezier curves 189). Once the boundaries of the object are determined, the maximum dimensions of the object may be calculated 121.

In an exemplary embodiment, the method 100 may include a step of determining 124 whether the object is large enough to assign to multiple threads. An example of object size may be based on pixel area. For example, if an object exceeds one or more pixel thresholds in any dimension, then the object may be large enough to justify (trigger) being processed by multiple threads. For example, in some current technologies, the object size threshold is 1200 pixels in height by 600 pixels in width. If the printing device has a resolution of 600 dpi, the object size will be 2 inches in height by 1 inch of width. This is an experimental threshold. That means if the object height is bigger than 1200 pixels and/or the object width is bigger than 600 pixels, applying multiple threads to the rendering of the object may be considered cost effective from a machine performance use of resources point of view. As will be appreciated, this feature may benefit computing resources by weighing whether the size of the object (for example, by its dimensions) justifies the time-cost saved by using multi-threaded processing. If the object is too small, then the method may opt to not use multi-threading because the computing resources used may not justify the time saved. However, if the object is large enough (the determination of which may depend on the number of threads used, cores available, and time to process), then the object may be divided 130 into multiple parts (M), where M is less than or equal to the number of threads N available.

In an exemplary embodiment, the division 130 of the object 180 may be performed along a single axis, for example, the Y axis direction, generating rows of the object 180 (assuming the object is plotted out in a conventionally labeled Cartesian coordinate system). The example shown in FIG. 3 assumes there are at least four threads available and thus, the object 180 is divided into four sections (rows) for processing. As shown in FIG. 3, the rows are of equal height (¼ height of the object for each row). In some embodiments however, the divided sections may comprise unequal row heights or unequal size/area of the object content within the divided sections of the coordinate area. The method 100 may further include assigning 133 different threads to the different divided up sections (rows) of the object 180. FIG. 3 shows the different sections labeled as "Part 1", "Part 2", etc. "Thread 1" may be assigned to "Part 1", Thread 2" assigned to "Part 2" and so on until each section of the mapped object has a thread assigned to it.

The following steps may be performed using multi-thread processing if the determination 124 justifies the use of multiple threads. However, if the determination 124 did not indicate justification for multi-threaded processing or likewise any other determination described below did not determine the justification, then the following steps may in some embodiments use single threaded processing if the input image object was not divided up into multiple sections for processing.

Figure 4:
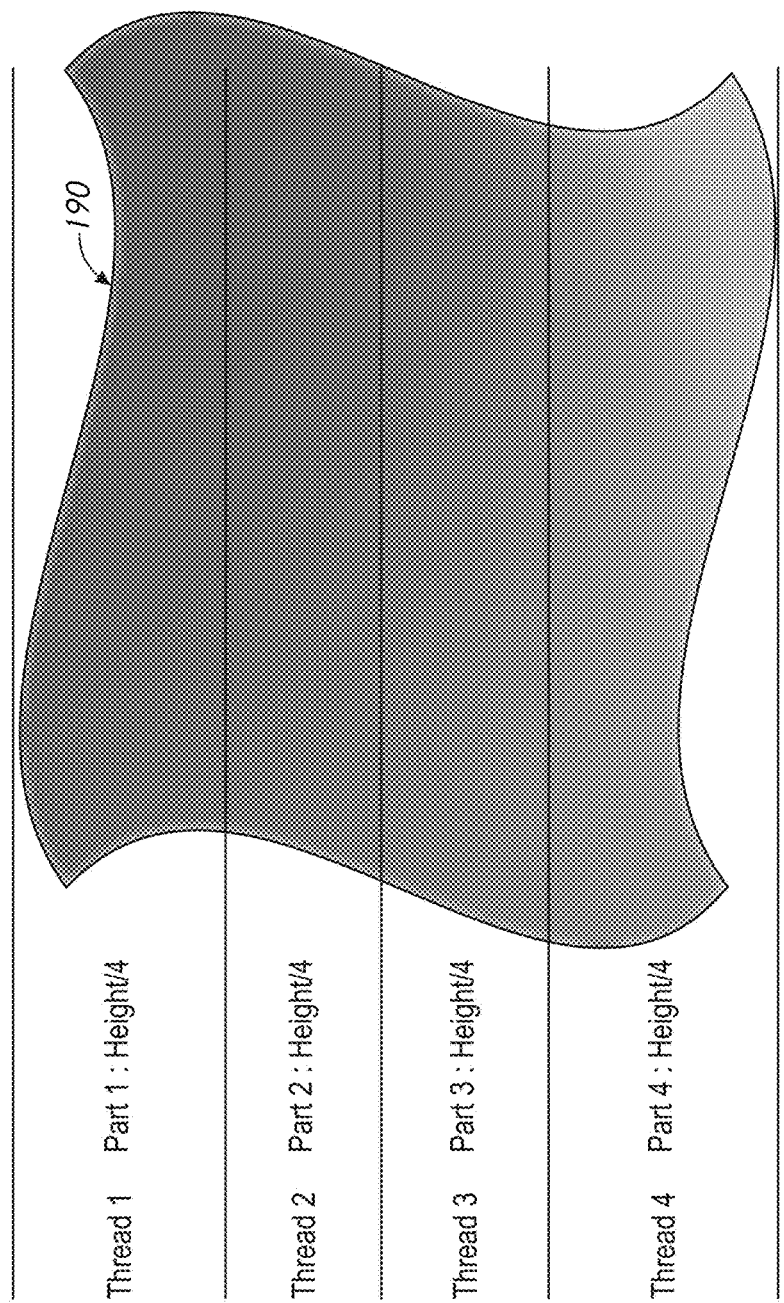
FIG. 4 is a chart showing a result of the object rendered according to the assignments in the chart of FIG. 4.

The method 100 may further include generating 136 orders for which pixels may be scanned into position for the rendered object. The orders may be rendered 139 using the multiple threads to generate a raster image along each section of the map. Referring temporarily to FIG. 4, an example of a raster image 190 rendered from the object 180 of FIG. 3 according to elements of the method 100 is shown. In some embodiments, the raster image may undergo steps of color conversion 142 and/or halftoning 145. While color cannot be seen in the image of FIG. 4 (due to patent drawing standards), it will be understood that different areas of the raster image may contain different color apart from the halftoning that can be made out by the different shading densities of different areas. The final step may include outputting 148 the rendered image.

In the event the object was not large enough (determination 124), in some embodiments, the method 100 may proceed through a different analysis of the input image object to determine whether multi-threaded processing is justified. The system may get 127 the number of polygons generated or pieces of scan lines generated (from step 118 for example) for the input object map. A determination 151 may be performed checking whether the number of trapezoids or scanlines require enough data processing to justify assigning their rendering to multiple threads. This determination may depend on the time cost versus the computing power needed to accomplish the rendering using multiple threads. If the number of trapezoids or scanlines is sufficiently large in data, then the method 100 may proceed to step 130 where the object is divided up into sections for processing by assigned multiple threads thereafter. The method 100 would proceed accordingly under the description above that follows step 133 or in the alternative, if the number of trapezoids or scanlines is insufficient to justify using multiple threads, then the method 100 may proceed directly to step 136 and continue therefrom without multi-threaded processing being implemented.

Returning back to step 112, if the input object is not a vector-based object, then the method 100 may include determining 154 whether the object is a raster. If the object is not a raster, then another process 157 may need to be performed to process the image. However, for raster objects, the output area of the raster object may be calculated 160. Based on the calculated output area of the raster, a determination 163 may be performed as to whether the output area of the raster object is large enough to justify using multiple threads for rendering the object. If the raster object is not large enough, then the raster object may be rendered according to steps 136 and so on without multi-threaded processing as described above until the process ends. However, if the raster object is sufficiently large, then the raster object may be divided up 166 into sections, ((M) parts less than threads (N)) similar to step 130. Once the raster object is divided up, each divided section of the raster object (for example rows of the object), may be assigned 169 to a different thread. In an exemplary embodiment, each thread may calculate 172 the pixel color value for every pixel in its section of the raster object by coordinate reverse mapping. The raster object may be rendered by the multiple threads according to steps 136 and so on as described above using multi-threaded processing until the process ends.

Figure 5:
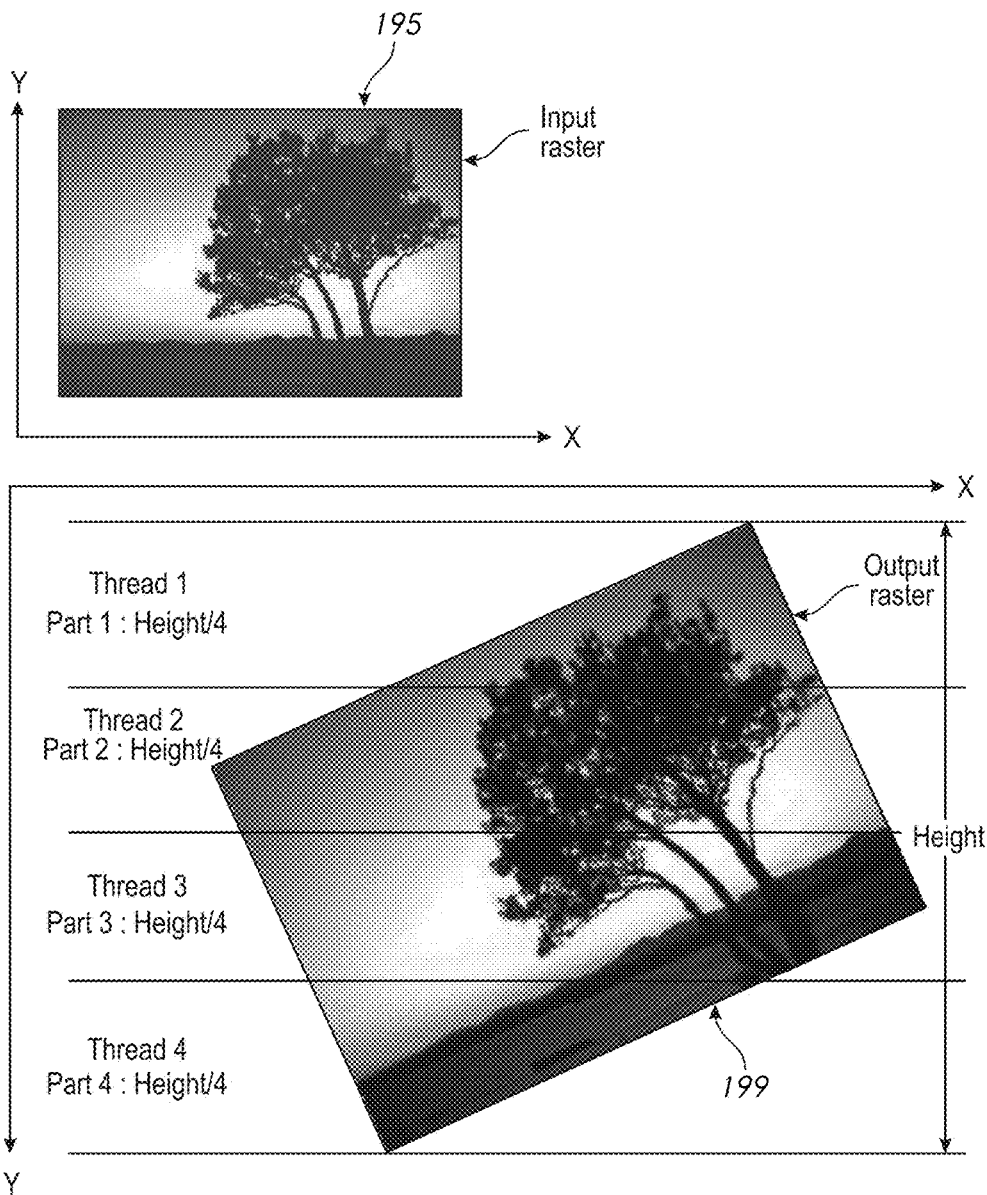
FIG. 5 are charts showing an input raster object and an output raster object rotated and enlarged with the output raster object rendered in parts assigned to multiple threads in accordance with embodiments of the subject technology.

Referring now to FIG. 5, an example implementation of some of the features of method 100 is further shown for raster objects being the input object. An input raster 195 and an output raster 199 that has been rotated and zoomed up are shown. If the rendering system has 4 cores available for use, the raster output area may be split into 4 parts, each of which has ¼ of the output area height. Four threads are generated and assigned to each part of the raster object. Each thread may only render the pixels that are in their assigned part. For example, "Thread1" only calculates pixel colors in "Part1" using reverse mapping, then generates and renders orders for "Part1". "Thread2" only calculates pixel colors in "Part2" using reverse mapping, then generates and renders orders for part2 and so on. As will be appreciated, including reverse mapping of pixels in the process provides improved rendering quality to the output image. As is known by those in the art, conventional mapping of a raster image does not cover every pixel from the input object. By including reverse mapping according to embodiments of the subject technology, every pixel in the output image is accounted for.

The following is a detailed discussion of an approach to raster rendering using reverse mapping.

Assume the following coordinate rotation example.

$$\begin{pmatrix} x' \\ y' \end{pmatrix} = \begin{pmatrix} \cos\theta & -\sin\theta \\ \sin\theta & \cos\theta \end{pmatrix} \begin{pmatrix} x \\ y \end{pmatrix},$$

where (x', y') are the destination coordinates, (x, y) are the input coordinates, and θ is the input angle that the raster should be rotated. The conventional mapping method will get the input pixel color of (x, y) coordinate and then insert the color to destination (x', y'), where x'=x cos θ−y sin θ and y'=x sin θ+y cos θ.

A problem occurs when x' and y' are not integers. If x' or y' is not an integer, the conventional mapping approach rounds the value up to an integer. Calculation errors happen when rounding up. This will cause some pixels in the destination image space to lose a corresponding input pixel. In particular, conventional mapping of raster images would suffer when rendering across multiple threads because the errors would show up all over the output space along different orders.

According to exemplary embodiments of the subject technology, the coordinate reverse mapping process takes every pixel (x', y') in the destination space first and then determines its corresponding pixel in the input coordinate space. To do that, a reversed coordinate transform matrix is calculated. The reversed coordinate transform matrix may be determined from the matrix of:

$$\begin{pmatrix} \cos\theta & \sin\theta \\ -\sin\theta & \cos\theta \end{pmatrix}$$

The corresponding input pixel (x, y) for every destination (x', y') may be determined using the following formula:

$$\begin{pmatrix} x \\ y \end{pmatrix} = \begin{pmatrix} \cos\theta & \sin\theta \\ -\sin\theta & \cos\theta \end{pmatrix} \begin{pmatrix} x' \\ y' \end{pmatrix}$$

As will be appreciated, every pixel becomes accounted for and reverse mapping makes it possible to apply multiple threads to rendering a raster.

Figure 6:
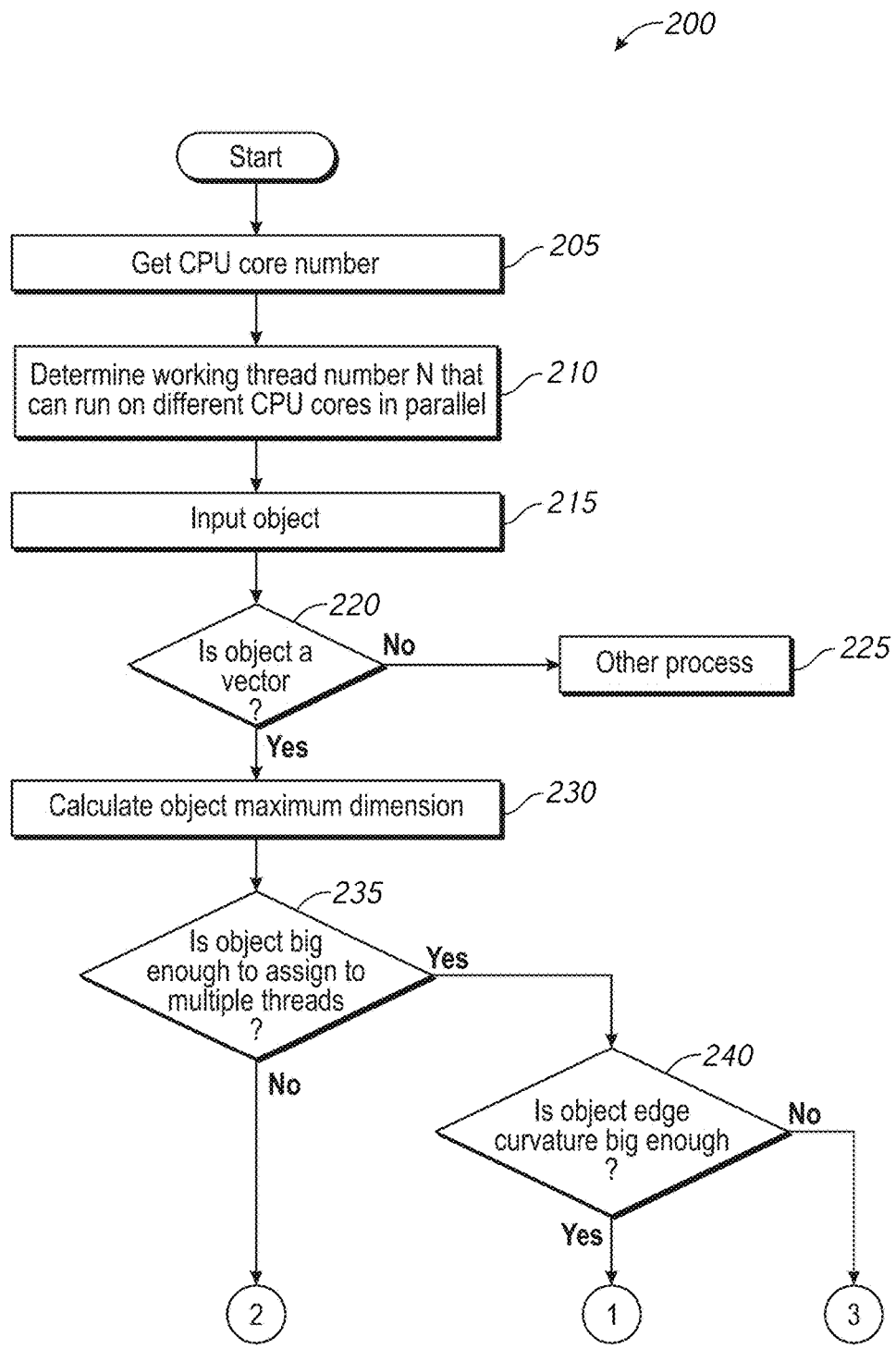
FIGS. 6 and 7 are a flowchart of a method of rendering an object with sufficient edge curvature using multiple threads in a multi-core processor in accordance with an embodiment of the subject technology.
Figure 7:
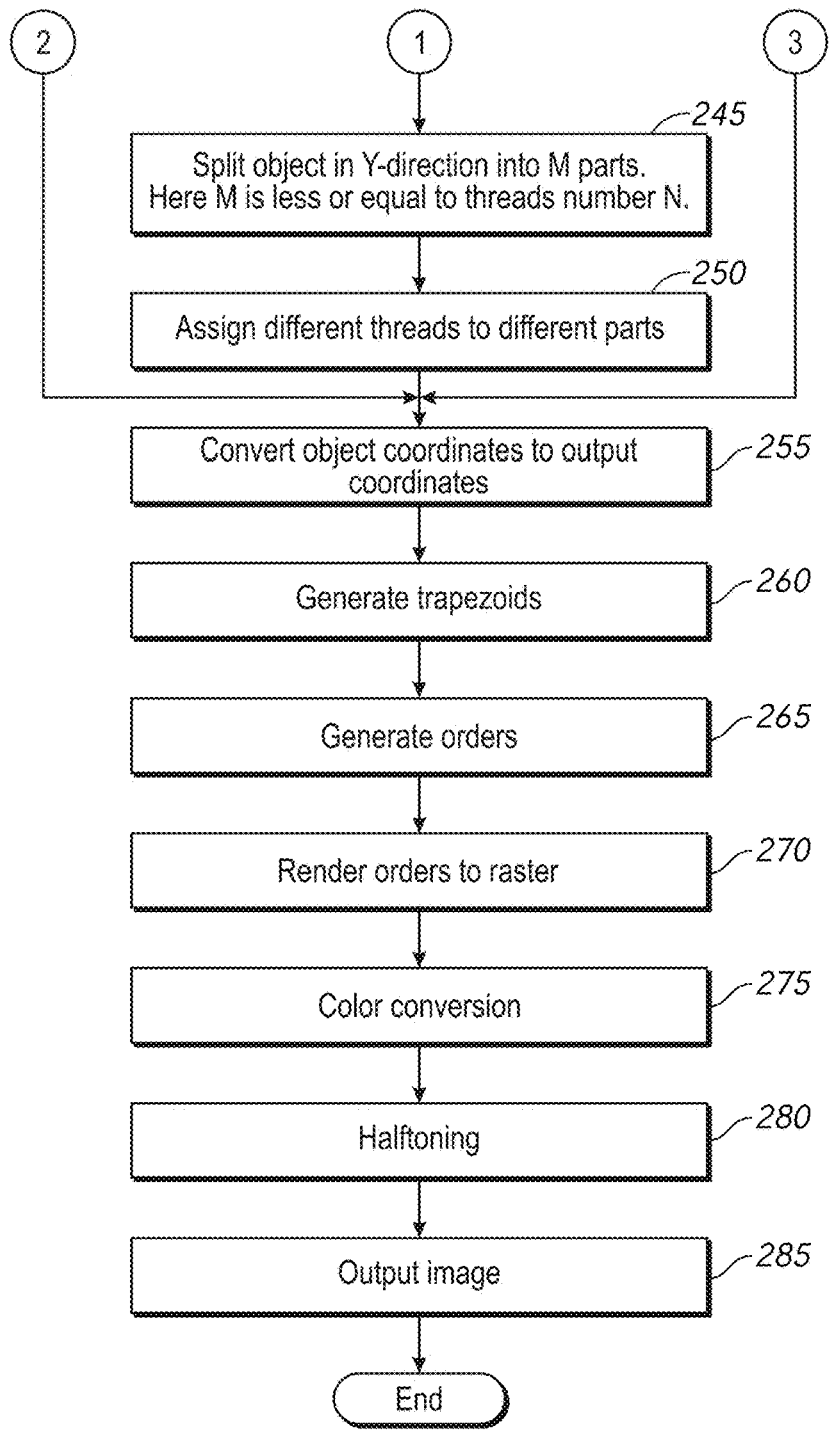

Referring now to FIGS. 6 and 7, a method 200 of rendering an object with sufficient edge curvature using multiple threads in a multi-core processor is shown according to an exemplary embodiment. It will be understood that in some embodiments, the method 200 may be part of method 100 but for sake of clarity, the application of the concepts discussed above is separated out for this particular application to edge curvature. As will be appreciated, the following is another example of how multi-threaded processing may be applied to image object processing to improve the efficiency of computing resources to the field. In general, if a vector object is big enough and edge curvature is big enough, which means many trapezoids need to be generated, multiple threads can be assigned to generating the trapezoids. As may be appreciated, image objects which need many trapezoids for large curvatures require more processing power.

The method 200 may begin by retrieving 205 a number of cores available in a computing system executing the method 200. From the number of available cores, a determination 210 may be performed as to the number of working threads N that may run in parallel on different cores. An object may be received (input by a user or queued up by an automated program for rendering objects) 215. A determination 220 may be performed determining whether the input object is a vector-based object. If the object is not vector-based, then another process may need to be performed 225 to render the object. If the object is vector-based, then the object's maximum dimension may be calculated 230. A determination 235 of whether the object is large enough to assign multiple threads to for rendering may be performed.

If the object is large enough, then a determination 240 may be performed as to whether the object has edge curvature large enough to justify using multiple threads. If so, the object may be divided up 245 into multiple parts (M), where M is less than or equal to the number of threads N available. In an exemplary embodiment, the input object is divided up in rows across the Y-axis. The method 200 may further include assigning 250 different threads to the different divided up sections (rows) of the object for processing the sections in parallel with the following steps to render the final output object.

The input object coordinates may be converted 255 to output coordinates. The method 200 may further include generating 260 trapezoids to fill up the input space for the object. Orders may be generated 265 for which pixels may be scanned into position for the rendered object. The orders may be rendered 270 using the multiple threads to generate a raster image along each section of the map space. In some embodiments, the raster image may undergo steps of color conversion 275, and/or halftoning 280 before outputting 285 the rendered image.

In the event the input object was not large enough as determined in step 235 or the edge curvature was not large enough, the method 200 may proceed directly to the step of converting 255 the object coordinates to output coordinates and the steps that follow may be performed without multi-threaded processing.

Figure 8:
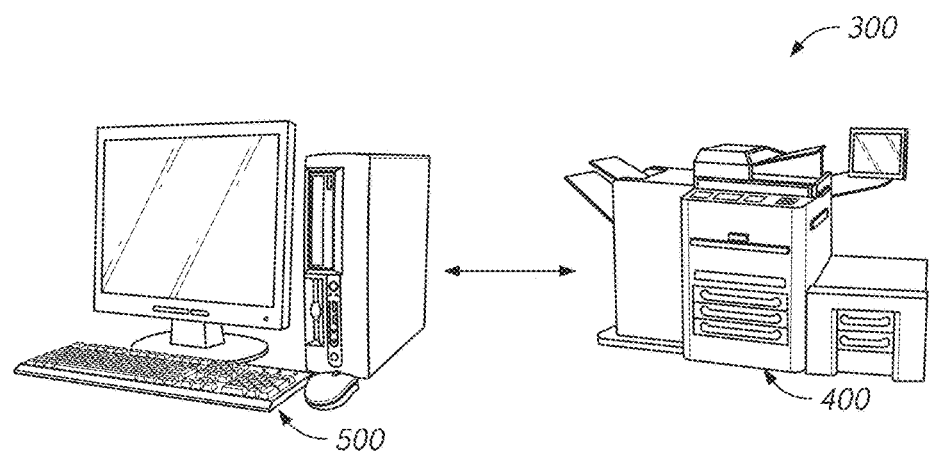
FIG. 8 is a schematic of a print job system in accordance with an embodiment of the subject technology.
Figure 9:
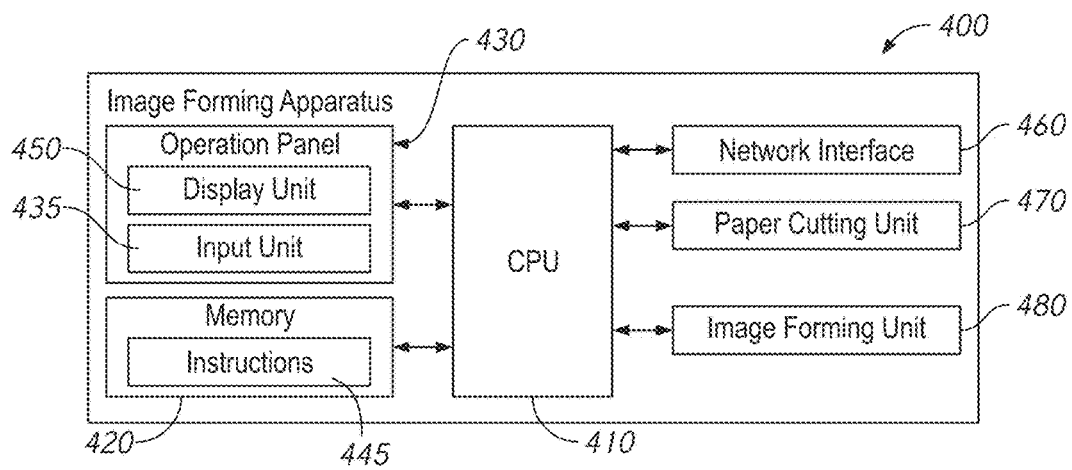
FIG. 9 is a block diagram of an image forming apparatus in accordance with an embodiment of the subject technology.
Figure 10:
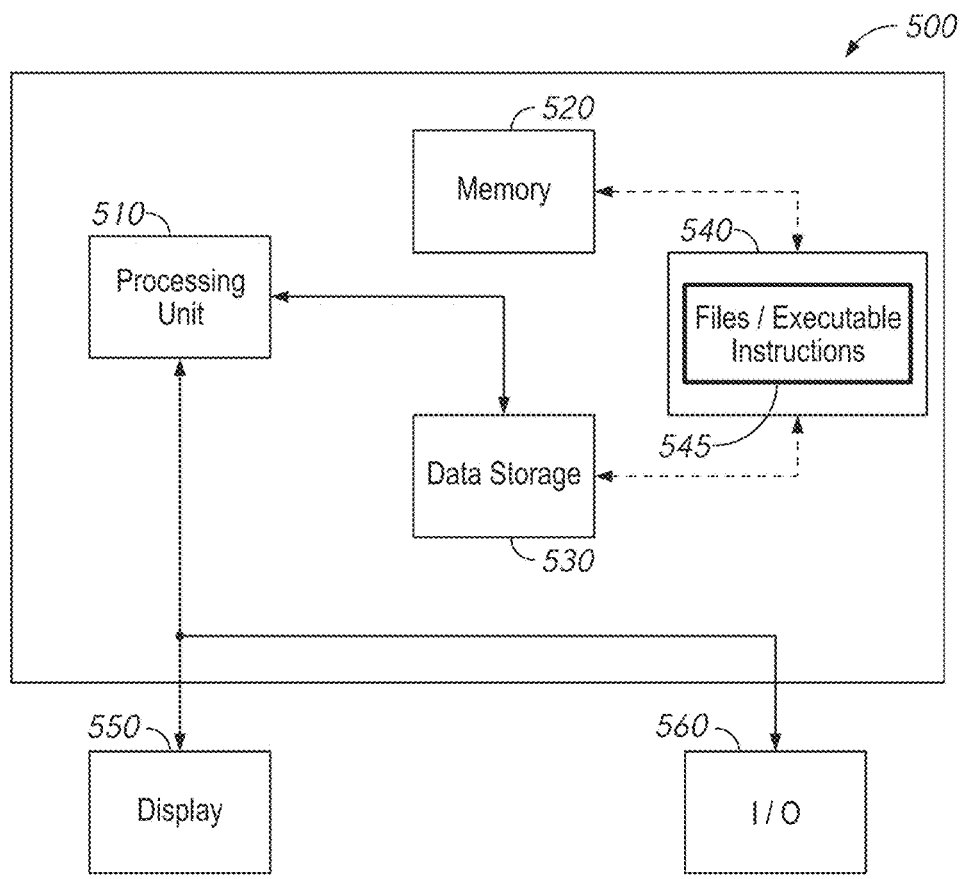
FIG. 10 is a block diagram of a computing device in accordance with an aspect of the subject technology.

Referring now to FIGS. 8-10, system and machines of the subject technology are shown according to exemplary embodiments. A system 300 is shown in FIG. 8 which may include an image forming apparatus 400 connected to a computing device 500. In some embodiments, the above described process(es) may be loaded as executable instructions into one or both of the image forming apparatus 400 and the computing device 500. FIG. 8 shows a schematic example of the image forming apparatus 400. FIG. 9 shows a schematic example of a computing device 500. In general, the process(es) above for image rendering may be implemented by either or both the image forming apparatus 400 and the computing device 500. In addition, it will be understood that multiple instances of the computing device 500 may be connected to the same image forming apparatus 400, however, for sake of illustration, a single computing device 500 is shown. In some embodiments, the image forming apparatus 400 and/or the computing device 500 may include software embodiments, which may provide a digital preview of images rendered according to the embodiments described above. The preview may be saved as a file which may be stored, transferred, and recalled for future print requests.

The image forming apparatus 400 may be for example, a computing-based image processing and printing device that can receive print job requests (for example, a printer, a fax machine, a copier machine or multi-function device with these functions and more). The components of the image forming apparatus 400, may include, but are not limited to, one or more processors or processing units 410, a system memory 420, an operation panel 430, an input unit 435, a set of program modules 445 including files and executable instructions, a display unit 450, a network interface 460, a paper cutting unit 470, an image forming unit 480, and a bus system that couples various system components including the system memory 420 to the processor(s) 410. The system memory 420 may store for example, executable instructions and/or electronic versions of the image objects to be rendered.

In some embodiments, the processors 410 are multi-core computer processors which by virtue of the processes described above may implement the rendering actions through multiple threads. The processors 410 may include a processing unit dedicated to graphics and image processing (for example a graphics processing unit (GPU) or visual processing unit (VPU). As a GPU or VPU, the processor 410 may implement executable instructions focused on image processing applications (like those related to rendering the image objects into print jobs) either alone or in coordination with other general processor 410 types such a CPUs, microchips, and the like.

The computing device 500 may be for example, a computer system or a computer server. In some embodiments, the image forming apparatus 400 may be another example of a computing device 500. As will be appreciated, some aspects of the embodiments disclosed above may turn the computing device 500 into a special purpose computer system by rendering image objects through multi-core processors and multi-threaded implementation. For example, in the role of a host server, the computing device 500 may implement for example the functions of storing electronic image object files with connected users and their workstations. More particular to this disclosure, as a host server, the computing device 500 may receive and store print job requests and render image objects according to the process(es) described above. In the role of a user device, the computing device 500 is generally not a server but may instead be desktop computers, tablet or laptop computers, all-in-one computer stations, a mobile computing device (for example, a smart phone, smart wearable devices (glasses, jewelry, watches, ear wear, etc.), or programmable electronics.

The components of the computer system or server, may include, but are not limited to, one or more processors or processing units 510, a system memory 520, data storage 530 (sometimes referred to as memory or memory storage), a computer program product 540 having a set of program modules 545 including files and executable instructions, and a bus system that couples various system components including the system memory 520 to the processor(s) 510. The system memory 520 may store for example, electronic files of the image objects to be printed.

In some embodiments, the processors 510 are multi-core computer processors which by virtue of the processes described above may implement the rendering actions through multiple threads. The processors 510 may include a processing unit dedicated to graphics and image processing (for example a graphics processing unit (GPU) or visual processing unit (VPU). As a GPU or VPU, the processor 510 may implement executable instructions focused on image processing applications (like those related to converting unrendered image content data through multi-threaded executed processes as described above) either alone or in coordination with other general processor 510 types such a CPUs, microchips, and the like.

The computing device 500 may be described in the general context of computer system executable instructions, such as the program modules 545 which represent a software embodiment of the system and processes described generally above. The program modules 545 generally carry out the functions and/or methodologies of embodiments as described above. The computing device 500 may typically include a variety of computer system readable media. Such media could be chosen from any available media that is accessible by the computing device 500, including non-transitory, volatile and non-volatile media, removable and non-removable media for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing. The system memory 520 could include one or more computer system readable media in the form of volatile memory, such as a random-access memory (RAM) and/or a cache memory. By way of example only, the data storage system 530 may read from and write to a non-removable, non-volatile magnetic media device. The system memory 520 may include at least one program product 540 having a set of program modules 545 that are configured to carry out the functions of embodiments of the invention in the form of computer executable instructions. The program product/utility 540, having a set of program modules 545, may be stored in the system memory 520 by way of example, and not limitation, as an operating system, one or more application programs, other program modules, and program data. Some embodiments may generate an electronic user interface (viewable and controllable from the display unit 550 or display 550) that may allow the user to enter image objects for processing.

The computing device 500 may communicate with one or more external devices including for example, an electronic display 550 which may in some embodiments be configured for tactile response as in a touch screen display. User input into the display 550 may be registered at the processor 510 and processed accordingly. Other devices may enable the computing device 500 to communicate with one or more other computing devices, either by hardwire or wirelessly. Such communication can occur via Input/Output (I/O) interfaces/ports 560. In some embodiments, the I/O interfaces/ports 560 may be specially configured to handle aspects of the embodiments described herein converting the computing device 500 into a special purpose machine. For example, as a printer, the I/O interfaces/ports 560 may be configured to transmit receipt of the image objects with their respective metadata for use in conversion and rendering into a final image for printing. The printer 500 as a standalone computing device (or as connected to the computing device 500) may be dedicated to printing and cutting jobs. The I/O interfaces/ports 560 may also include printing modules (for example, ink jet print heads, laser print systems, etc.) for rendering a physical embodiment of the converted image objects onto a page.

The computing device 500, through the I/O interface/ports 560, may communicate with one or more networks such as a local area network (LAN), a general wide area network (WAN), and/or a public network (e.g., the Internet) via a network adapter as is commonly known in the art. Each of the operating system, one or more application programs, other program modules, and program data or some combination thereof, may include an implementation of a networking environment. In some embodiments, the computing device 500 may be a cloud computing node connected to a cloud computing network (not shown). The computer computing device 500 may be practiced in distributed cloud computing environments where tasks are performed by remote processing devices that are linked through a communications network. In a distributed cloud computing environment, program modules may be located in both local and remote computer system storage media including memory storage devices. Thus, members contributing to for example, the overall system being developed described above may provide software modules to the computing device 500 which may hold electronic files and copies in more than one physical location, each of which may be referenced and/or may trigger automated processes (for example, once a threshold number of print job requests are received).

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "module", "circuit", or "system." For example, a "memory module" may in some hardware embodiments be any one of the system memory 420, the system memory 520, the data storage 530 or any combination thereof. Furthermore, aspects of the disclosed invention may take the form of a computer program product embodied in one or more computer readable media having computer readable program code embodied thereon. In some embodiments, the output of the computer program product provides an electronic user interface on the display 550 which may be controlled via direct contact with the display 550 or via the I/O interfaces 560 (which may be for example, interface devices such as keyboards, touchpads, a mouse, a stylus, or the like).

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 510 of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks in the figures.

Those of skill in the art would appreciate that various components and blocks may be arranged differently (e.g., arranged in a different order, or partitioned in a different way) all without departing from the scope of the subject technology. The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

Thus, the claims are not intended to be limited to the aspects shown herein, but are to be accorded the full scope consistent with the language of claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method of image object rendering, by a computer processor with multiple cores, comprising:
    retrieving a number of cores in the computer processor;
    determining a number of threads N available to run processes in parallel in the number of cores;
    receiving an image object for rendering;
    determining whether the image object is a vector;
    calculating a size of the image object based on maximum object dimensions of the vector;
    determining whether the size of the image object exceeds a threshold criterion to justify assigning the number of threads to processing the image object;
    assigning a first available thread, from the determined number of threads N available, to a first section of the image object;
    assigning a second available thread, from the determined number of threads N available, to a second section of the image object; and
    rendering the first section of the image object using the first available thread, in parallel with, rendering the second section of the image object using the second available thread to render a final output object.

2. The method of claim 1, further comprising:
    dividing the image object into a number of sections less than or equal to the determined number of threads N available to run processes in parallel, wherein N is greater than 1 and the number of sections is at least 2; and
    assigning each section of the image object to an available thread.

3. The method of claim 2, wherein the step of dividing the image object includes dividing the image object into sections along a horizontal direction or a vertical direction.

4. The method of claim 1, wherein the first section of the image object is a different section of the image object than the second section.

5. The method of claim 1, further comprising:
    determining whether the image object has edge curvature large enough to justify assigning the number of threads to processing the image object prior to assigning the first available thread to the first section of the image object.

6. The method of claim 1, further comprising:
    calculating an output area of the image object based on an output area of coordinates for the final output object prior to the step of rendering the first section of the image object using the first available thread, in parallel with, rendering the second section of the image object using the second available thread; and
    generating trapezoids with the first available thread and the second available thread, filling up an input space of the final output object.

7. The method of claim 6, further comprising:
    determining a time cost associated with rendering the image object based on the size of the image object, a number of trapezoids needed to be generated, or the output area of the image object; and
    rendering the first section of the image object using the first available thread, in parallel with, rendering the second section of the image object using the second available thread when the time cost is above a threshold value of rendering the image object.

8. A computer program product for image object rendering, by a computer processor with multiple cores, the computer program product comprising a non-transitory computer readable storage medium having computer readable program code embodied therewith, the computer readable program code being configured, when executed by the processor with multiple cores, to:
retrieve a number of cores in the computer processor;
determine a number of threads N available to run processes in parallel in the number of cores;
receive an image object for rendering;
determine whether the image object is a vector;
calculate a size of the image object based on maximum object dimensions of the vector;
determine whether the size of the image object exceeds a threshold criterion to justify assigning the number of threads to processing the image object;
assign a first available thread, from the determined number of threads N available, to a first section of the image object;
assign a second available thread, from the determined number of threads N available, to a second section of the image object; and
render the first section of the image object using the first available thread, in parallel with, rendering the second section of the image object using the second available thread to render a final output object.

9. The computer program product of claim 8, further comprising computer readable code configured to:
divide the image object into a number of sections less than or equal to the determined number of threads N available to run processes in parallel, wherein N is greater than 1 and the number of sections is at least 2; and
assign each section of the image object to an available thread.

10. The computer program product of claim 9, wherein the step of dividing the image object includes dividing the image object into sections along a horizontal direction or a vertical direction.

11. The computer program product of claim 8, wherein the first section of the image object is a different section of the image object than the second section.

12. The computer program product of claim 8, further comprising computer readable code configured to:
determine whether the image object has edge curvature large enough to justify assigning the number of threads to processing the image object prior to assigning the first available thread to the first section of the image object.

13. The computer program product of claim 8, further comprising computer readable code configured to:
calculate an output area of the image object based on an output area of coordinates for the final output object prior to the step of rendering the first section of the image object using the first available thread, in parallel with, rendering the second section of the image object using the second available thread; and
generate trapezoids with the first available thread and the second available thread, filling up an input space of the final output object.

14. The computer program product of claim 13, further comprising computer readable code configured to:
determine a time cost associated with rendering the image object based on the size of the image object, a number of trapezoids needed to be generated, or the output area of the image object; and
render the first section of the image object using the first available thread, in parallel with, rendering the second section of the image object using the second available thread when the time cost is above a threshold value of rendering the image object.

15. An image rendering computing device, comprising:
a memory module; and
a multi-core processor in communication with the memory module, the multi-core processor configured, via a set of executable instructions stored in the memory module, to:
retrieve a number of cores in the multi-core computer processor;
determine a number of threads N available to run processes in parallel in the number of cores;
receive an image object for rendering;
determine whether the image object is a vector;
calculate a size of the image object based on maximum object dimensions of the vector;
determine whether the size of the image object exceeds a threshold criterion to justify assigning the number of threads to processing the image object;
assign a first available thread, from the determined number of threads N available, to a first section of the image object;
assign a second available thread, from the determined number of threads N available, to a second section of the image object; and
render the first section of the image object using the first available thread, in parallel with, rendering the second section of the image object using the second available thread to render a final output object.

16. The image rendering computing device of 15, wherein the multi-core processor is further configured to:
divide the image object into a number of sections less than or equal to the determined number of threads N available to run processes in parallel, wherein N is greater than 1 and the number of sections is at least 2; and
assign each section of the image object to an available thread.

17. The image rendering computing device of 16, wherein the step of dividing the image object includes dividing the image object into sections along a horizontal direction or a vertical direction.

18. The image rendering computing device of 15, wherein the multi-core processor is further configured to:
determine whether the image object has edge curvature large enough to justify assigning the number of threads to processing the image object prior to assigning the first available thread to the first section of the image object.

19. The image rendering computing device of 15, wherein the multi-core processor is further configured to:
calculate an output area of the image object based on an output area of coordinates for the final output object prior to the step of rendering the first section of the image object using the first available thread, in parallel with, rendering the second section of the image object using the second available thread; and
generate trapezoids with the first available thread and the second available thread, filling up an input space of the final output object.

20. The image rendering computing device of 19, wherein the multi-core processor is further configured to:
determine a time cost associated with rendering the image object based on the size of the image object, a number of trapezoids needed to be generated, or the output area of the image object; and
render the first section of the image object using the first available thread, in parallel with, rendering the second section of the image object using the second available thread when the time cost is above a threshold value of rendering the image object.

* * * * *